US 006991060B2

(12) United States Patent
Chernoff et al.

(10) Patent No.: US 6,991,060 B2
(45) Date of Patent: Jan. 31, 2006

(54) VEHICLE HAVING A MOVABLE DRIVING POSITION

(75) Inventors: Adrian B. Chernoff, Royal Oak, MI (US); Eugenio Pagliano, Rosta (IT)

(73) Assignee: General Motors Corporation, Detroit, MI (US)

( * ) Notice: Subject to any disclaimer, the term of this patent is extended or adjusted under 35 U.S.C. 154(b) by 70 days.

(21) Appl. No.: 10/318,335

(22) Filed: Dec. 12, 2002

(65) Prior Publication Data

US 2003/0141736 A1    Jul. 31, 2003

Related U.S. Application Data

(60) Provisional application No. 60/341,517, filed on Dec. 13, 2001.

(51) Int. Cl.
*B60K 26/00*    (2006.01)
(52) U.S. Cl. ............... 180/326; 180/329; 180/330; 297/344.21
(58) Field of Classification Search ............... 180/326, 180/329, 330; 297/344.21, 344.24
See application file for complete search history.

(56) References Cited

U.S. PATENT DOCUMENTS

| | | | |
|---|---|---|---|
| 630,003 A | | 8/1899 | Olson et al. |
| 1,467,456 A | * | 9/1923 | Silvius ........................ 472/28 |
| 1,682,989 A | * | 9/1928 | Smelker ..................... 297/461 |
| 1,735,321 A | * | 11/1929 | Kilburn ................ 297/344.25 |
| 3,195,913 A | * | 7/1965 | Hallsworth ................ 280/775 |
| 3,394,964 A | * | 7/1968 | Humphries et al. ......... 297/240 |
| 4,026,379 A | * | 5/1977 | Dunn et al. ................ 180/331 |
| 4,324,301 A | * | 4/1982 | Eyerly ........................ 180/2.1 |
| 4,690,031 A | * | 9/1987 | Metz et al. ................ 89/36.13 |
| 4,846,529 A | * | 7/1989 | Tulley ..................... 297/344.23 |
| 5,086,869 A | * | 2/1992 | Newbery et al. ........... 180/329 |
| 5,090,513 A | * | 2/1992 | Bussinger .................. 180/271 |
| 5,249,636 A | * | 10/1993 | Kruse et al. ................. 180/21 |
| 5,366,281 A | | 11/1994 | Littlejohn ..................... 303/3 |
| 5,823,636 A | | 10/1998 | Parker et al. ................. 303/3 |
| 5,895,093 A | * | 4/1999 | Casey et al. ........... 297/344.23 |
| 6,176,341 B1 | | 1/2001 | Ansari ........................ 180/402 |
| 6,208,923 B1 | | 3/2001 | Hommel ....................... 701/42 |
| 6,219,604 B1 | | 4/2001 | Dilger et al. ................. 701/41 |
| 6,296,221 B1 | * | 10/2001 | Nadeau ....................... 248/631 |
| 6,302,483 B1 | * | 10/2001 | Ricaud et al. .......... 297/344.24 |
| 6,305,758 B1 | | 10/2001 | Hageman et al. ......... 303/115.2 |
| 6,318,494 B1 | | 11/2001 | Pattok ......................... 180/402 |
| 6,361,111 B1 | * | 3/2002 | Bowers et al. .......... 297/344.22 |
| 6,370,460 B1 | | 4/2002 | Kaufmann et al. ............ 701/41 |
| 6,390,565 B2 | | 5/2002 | Riddiford et al. .............. 303/3 |
| 6,394,218 B1 | | 5/2002 | Heitzer ....................... 180/402 |
| 6,666,514 B2 | * | 12/2003 | Muraishi et al. ........ 297/344.22 |
| 6,684,969 B1 | * | 2/2004 | Flowers et al. ............ 180/65.1 |
| 6,711,839 B1 | * | 3/2004 | Kawamura et al. ........... 37/466 |

FOREIGN PATENT DOCUMENTS

ES    2102293    7/1997

* cited by examiner

*Primary Examiner*—David R. Dunn
*Assistant Examiner*—Toan C. To
(74) *Attorney, Agent, or Firm*—Kathryn A. Marra (57) ABSTRACT

A vehicle has multiple movable driving positions resulting from a seat which is movable with respect to the vehicle chassis and has a driver's vehicle interface which moves with the seat. A wire bundle interconnects the driver's vehicle interface with controls for driving the vehicle. In one embodiment, a carousel rotates and a seat on the carousel revolves and rotates so that the seat continues to face forward.

11 Claims, 6 Drawing Sheets

VEHICLE HAVING A MOVABLE DRIVING POSITION

CROSS REFERENCE TO RELATED APPLICATIONS

This application claims the benefit of U.S. Provisional Application 60/341,517 filed Dec. 13, 2001, which is hereby incorporated by reference.

TECHNICAL FIELD

This invention relates to a non-mechanical (by-wire) driver control of a vehicle which permits the driver to face the direction of travel and control the vehicle from a plurality of movable driving positions.

BACKGROUND OF THE INVENTION

By-wire steering, braking and acceleration controls and control systems on a vehicle are not designed to accomodate a change in position of a driver. Thus, although a prior art vehicle may include a driver's seat that is rotatable, allowing the driver to shift his position, the controls typically do not move to accommodate the change in position. This requires that the driver navigate the vehicle from controls positioned to accommodate the driver in the original seat position. These system limitations create less than optimal convenience for the driver. Controlling the steering, braking and acceleration functions of a vehicle from different positions spaced from the original seat position is inherently more difficult.

SUMMARY OF THE INVENTION

This invention is based on a method of mechanization utilizing drive-by-wire for drive, steer, brake, throttle, etc. where the driver's seat with the vehicle controls can move into optimal seating positions within a vehicle. The method of movement is based on the concept in one embodiment of a carousel or merry-go-round. The driver's seat and the passenger seat are adjacent to one another on a platform that moves or revolves in a circular pattern. The two seats rotate around a center point of the carousel which houses a wire bundle passing vehicle control data from the vehicle chassis to the driver's vehicle controls. The driver's vehicle control interface in this concept provides one method of vehicle control with the vehicle's foot operations being integrated into the driver's vehicle interface, or steering wheel. This arrangement enables the driver to accelerate, brake, stop, start, or turn from one location. The technical advantage of this arrangement is the flexibility to drive the vehicle from different positions within the vehicle. In this one embodiment, there are four seat positions in this invention forming a diamond pattern; left-hand drive, right-hand drive, center-front drive, and center-rear drive. As the carousel revolves, the seats are designed to face in the forward direction the vehicle is traveling. However, each seat may also swivel or rotate so that the driver may face rearwardly. Other advantages may include fold-down seat backs that turn into tables or other holding devices for the interior of the vehicle.

The invention serves the primary purpose of allowing a driver to operate a vehicle in the forward direction from a plurality of different rotational and revolvable positions of a driver's seat and driver's vehicle interface with respect to the frame, chassis or rolling platform or other portion of the vehicle.

Accordingly, the invention is a driver control for a vehicle which has a chassis or vehicle portion, a seating structure movable with respect to the chassis or vehicle portion, and a driver's interface movable with the seating structure to a plurality of positions from which a driver can control the vehicle.

Also, accordingly, a driver control is provided for a vehicle which has a chassis, a carousel structure rotatable with respect to the chassis, and a seating structure revolvable with the carousel structure to a plurality of positions from which a driver can control the vehicle. The seating structure may also be rotatable with respect to the carousel structure. The rotation of the seating structure may also be coordinated with the rotation of the carousel structure so that the seating structure revolves and faces in one predetermined direction as the carousel structure rotates.

The invention may also provide a driver control cockpit adapted for a drivable vehicle which has a rolling platform controllable from the cockpit. The control cockpit has a carousel structure adapted to be rotatable with respect to the rolling platform and has a passageway or space beneath the carousel structure and adapted to be substantially fixed with respect to the rolling platform, a seating structure revolvable with the carousel structure and around or with respect to the passageway or space to a plurality of positions from each of which a driver can drive or control the vehicle, and a driver vehicle interface positionable with respect to the seating structure for operation in each of the positions and adapted to be connectable to the rolling platform to control the platform through the passageway or space in the carousel structure. The seating structure may be rotatable with respect to the carousel structure. The driver control cockpit may have up to four positions forming a diamond pattern for the seating structure sufficient to define selectively a left-hand drive, right-hand drive, center-front drive, and center-rear drive. The rotation of the seating structure may be coordinated with the rotation of the carousel structure so that the seating structure faces in one predetermined direction as the carousel structure rotates, and the rolling platform may be controlled for the at least one of the vehicle driving functions in accordance with the position of the seating structure.

The driver control cockpit may be installable as a supplier-provided assembly on the rolling platform of the vehicle so that the rolling platform may be controllable to drive the vehicle in at least one of the vehicle driving functions such as steering, accelerating, decelerating, clutching, and braking the vehicle. The rolling platform may also be controllable for at least another of the vehicle driving functions by a foot operation in the assembly.

The driver control cockpit of the invention may also have a seating structure which includes a driver seat with a passageway and a passenger seat adjacent to the driver's seat and rotatable around a passageway or space in the rolling platform so that a driver vehicle interface may be connectable to the driving functions in the rolling platform by a wire bundle adapted for passing control data through the passageway and the space between the driver vehicle interface and the rolling platform.

The invention may also be a vehicle which has a controllable rolling platform, a carousel structure rotatable with respect to the rolling platform and having a passageway substantially fixed with respect to the rolling platform, a rotatable seating structure revolvable on the carousel structure to a plurality of positions from each of which a driver can-control the rolling platform of the vehicle, and a driver vehicle interface which is positionable with respect to the seating structure for operation in each of the positions and which is connectable to the rolling platform to control the rolling platform through a passageway in the seating structure.

The invention may also be a drivable vehicle comprising a frame, rolling platform or vehicle portion, a drive-by-wire control mounted with respect to the frame or vehicle portion and operable by wire, a driver's seat movable to a plurality of driving positions by moving with respect to the frame or vehicle portion in one manner and by moving with respect to the frame in another manner. The driver's seat has an operator interface operatively connectable to the drive-by-wire control for driving the vehicle. The operator interface is operable to drive the vehicle from each of the plurality of driver's seat positions occasioned by moving the driver's seat. The vehicle also includes a connector operatively associated with the operator interface and configured for complementary engagement with a drive-by-wire connector port mounted with respect to the frame and operatively connected to the drive-by-wire control.

A more specific embodiment of the invention is a vehicle that has a frame, at least three wheels operable with respect to the frame, a steering system, braking system and energy conversion system, each of which is mounted with respect to the frame, operably connected to at least one wheel and responsive to non-mechanical control systems. The vehicle has a seat rotatable to a plurality of different rotational and revolvable positions with respect to the frame. The invention includes a configuration wherein the seat is sufficiently limited in its rotational and revolvable movement to prevent over-twisting the wire bundle between the interface and the rolling platform. The vehicle also has an operator interface that is operably connected to at least one of the steering system, braking system and energy conversion system for driving the vehicle, and that is movable with respect to the frame in a manner that does not interfere with the rotation of the seat. The operator interface is operable or usable for operating the at least one of the steering, braking and energy conversion systems by hand and without foot action when the seat is in any of the plurality of different rotational and revolvable positions with respect to the frame. The invention includes a configuration wherein the operator interface is mounted in a fixed position with respect to the seat and movable therewith in a manner that does not interfere with the rotation of the seat.

The invention may also include an embodiment wherein a motor unit or units is operably connected to the seat and the carousel structure for rotating and revolving the seat to effect a change in position of the seat and to a sensor and wherein one sensor is operably connected to the seat and operable to sense the change in position of the seat with respect to the carousel structure and another sensor is operable to sense a change in position of the carousel structure with respect to the rolling platform.

The control cockpit may also include a driver interface movable with the seat having a passageway and operable for operating a rolling platform having a space and a drive-by-wire connector port when the control cockpit is mounted on the rolling platform. The driver interface is mounted in a fixed position with respect to the seat and rotatable and revolvable therewith. The control cockpit may also include at least one connector configured for connection with the drive-by-wire connector port at one end and connected at the other end to the driver interface while extending through the passageway and the space. In another embodiment of the invention, the control cockpit may also include a sensor or sensors operably connected with respect to the seat and rolling platform and operable to sense a rotational and revolvable change in position of the seat with respect to the rolling platform and another connector operably connected to the sensor or sensors at one end and configured for connection with a connector port at the other end while extending through the passageway and space and operable to operate the rolling platform. In this configuration, the sensor and connector may be used to adjust the control of the vehicle in response to the position of the seat.

The invention may also include a vehicle embodiment wherein the driver's seat is movable transversely and longitudinally with respect to the vehicle. This embodiment may also include passenger seat which is movable likewise. This embodiment may also include a driver's vehicle interface which is movable with the driver's seat.

The above objects, features, and advantages, and other objects, features and advantages of the present invention are readily apparent from the following detailed description of the best mode for carrying out the invention when taken in connection with the accompanying drawings.

DESCRIPTION OF THE PREFERRED EMBODIMENTS

Figure 1:
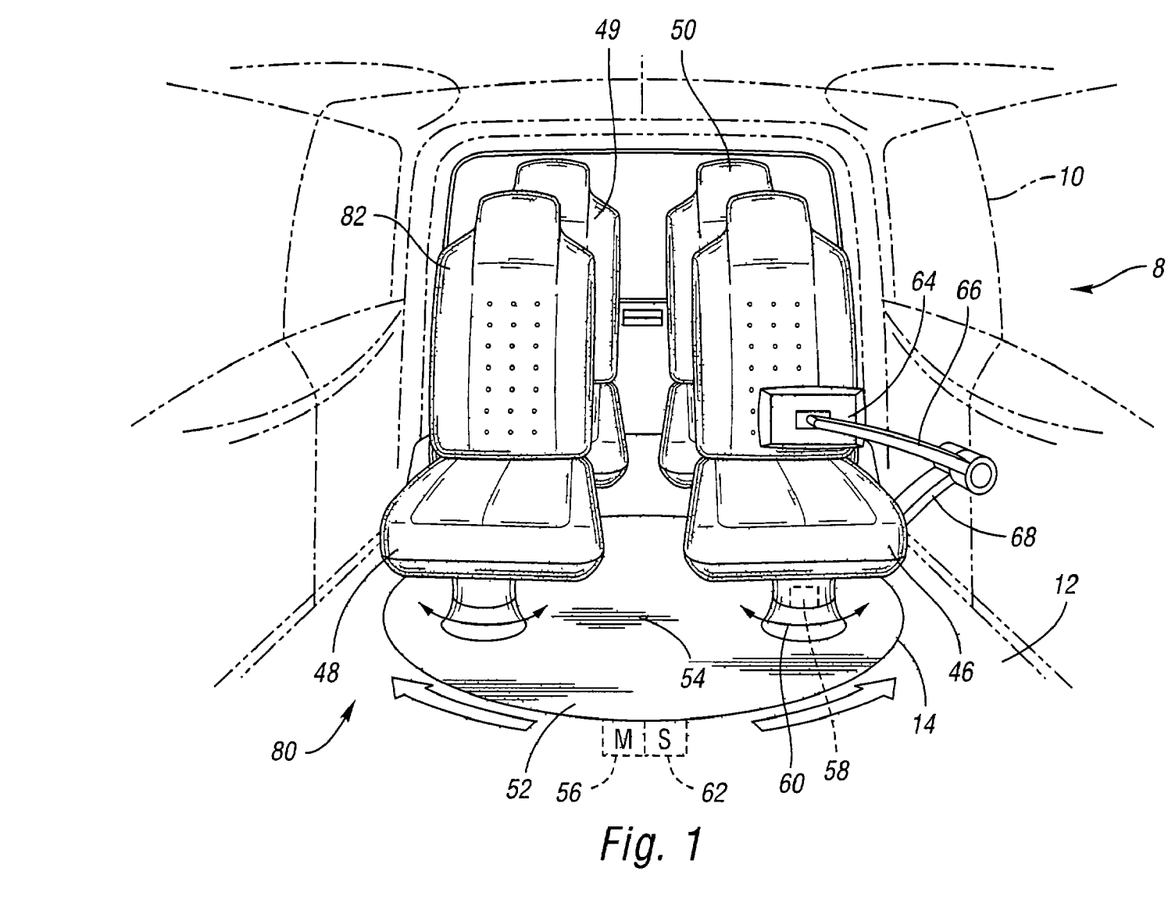
FIG. 1 is a perspective front to rear view of a vehicle cockpit, partly in phantom, in accordance with an embodiment of the invention, the vehicle having a pair of fixed rear seats and a pair of front seats rotatable and revolvable between driving positions, and a driver's interface operably connected to the driver's seat for controlling the vehicle's steering system, braking system and energy conversion system.

Referring to FIG. 1, a vehicle 8 in accordance with the invention includes a body 10 (in phantom), a standard thin chassis or rolling platform 12 and a driver's seat assembly or carousel 14. The vehicle 8 is preferably an automobile but the invention also contemplates that the vehicle may be a tractor or other industrial or commercial vehicle such as a bus. The invention also has utility in a non-automotive vehicle.

Figure 2:
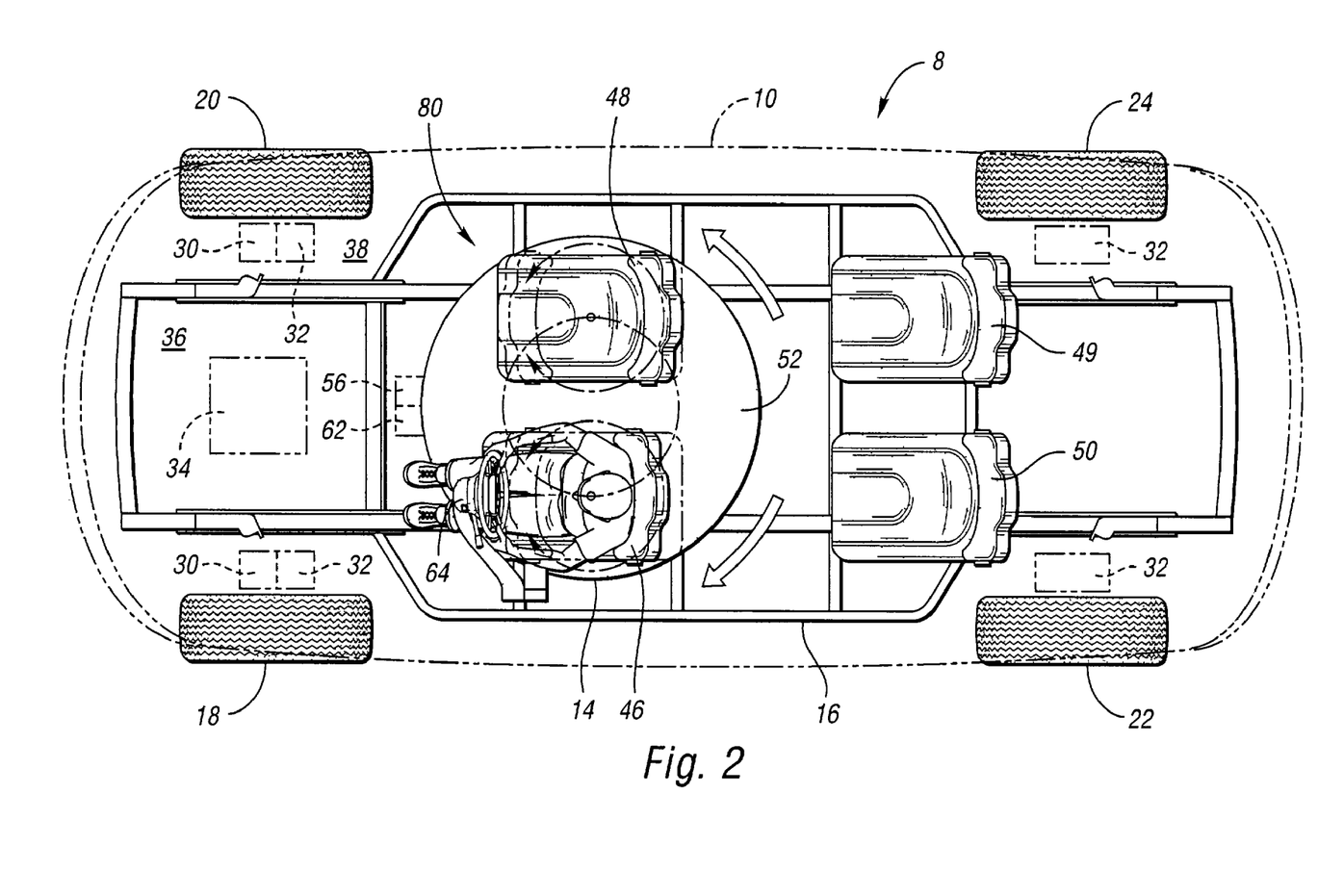
FIG. 2 is a schematic illustration of a driver's seat revolved to a left-front driving position for the vehicle of FIG. 1.

The chassis, also referred to herein as the rolling platform 12, includes a frame 16 having four wheels 18, 20, 22, 24 that are operable with respect to the frame 16, see FIG. 2. The chassis or rolling platform 12 together with the body 10 defines a vehicle, preferably an automobile, but the invention also contemplates that the vehicle may be a tractor, bus, or other industrial or commercial vehicle. Those skilled in the art will recognize materials and fastening methods suitable for attaching the wheels 18, 20, 22 and 24 to the frame 16.

The chassis 12 further includes a steering system 30, a braking system 32 and an energy conversion system 34, each of which is mounted with respect to the frame 16 and responsive to a by-wire or non-mechanical control signals. Embodiments of such systems are described in the assignee's copending application, GP-301583, U.S. Provisional Application 60/314,501, filed Aug. 23, 2001, which is incorporated by reference herein, and related cases.

The structural frame 16 becomes the rolling platform 12 by providing a rigid structure forming spaces 36, 38 in which the steering system 30, braking system 32 and energy conversion system 34 may be packaged and to which the wheels 18, 20, 22, 24 are mounted, as shown in FIG. 2. The rolling platform 12 is configured to support an attached body such as an automotive body 10 as taught in assignee's aforesaid copending application. A person of ordinary skill in the art will recognize that the structural frame 16 can take many different forms. For example, the structural frame 16 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan," wherein integrated rails and cross members are formed in sheets of metal or other suitable material, with other formations to accommodate various system components.

The chassis or rolling platform 12 includes a drive-by-wire connector port 42 that is mounted with respect to the frame 16 in or on a packaging space 40. The connector port is operably connected to the steering system, the braking system, and the energy conversion system. Persons skilled in the art will recognize various methods for mounting the drive-by-wire connector port 42 to the frame 16. In the preferred embodiment, the drive-by-wire connector port 42 is located in packaging space 40 near the top face of the rolling platform 12 beneath the driver's seat assembly or carousel 14. Various embodiments of the manner for operably connecting the drive-by-wire connector port 42 to the steering system, the braking system and the energy conversion system are described in assignee's copending application (GP-301583, U.S. Provisional Application 60/314,501, filed Aug. 23, 2001, and related cases).

The driver's seat assembly or carousel 14 includes a driver's seat 46 and a passenger seat 48, rotatably mounted on a rotatable, circular platform 52 which rotates on the top of and with respect to the rolling platform 12. The circular platform pivots about a pivot point 54 affixed with respect to frame 16, so that the rotatable seats 46, 48 revolve with respect to the pivot point 54. Two rear passenger seats 49, 50 are mounted in fixed relation to the rolling platform 12 behind the carousel seat assembly 14. The circular platform 52 of the carousel assembly 14 may be rotated by a pinion/gear arrangement 56. The rotation of driver's seat 46 with respect to circular platform 52 may be powered in a similar manner by a pinion/gear arrangement 58 in the pedestal 60 of the driver's seat 46. Circular platform sensors 62 and driver's seat sensor 63 sense the rotary position of the platform and seat, respectively. This results in a vehicle 8 which has a controllable rolling platform 12, a carousel structure or assembly 14 rotatable with respect to the rolling platform 12 and having a passageway or space 40 in close proximity to the revolving driver's seat 46 and substantially fixed with respect to the rolling platform. Both the driver's seat 46 and the passenger seat 48 are rotatable with respect to the carousel platform and revolvable with the carousel platform to a plurality of positions and from the driver's seat of which a driver can drive the vehicle. The vehicle also has a driver vehicle interface or control panel 64 positionable with respect to the seating structure 46 by articulated arms 66, 68 for operation in each of the driver's positions and connectable to the rolling platform 12 to control the platform through a passageway 70 in the driver's seat pedestal 60 of the carousel assembly 14.

The operator interface 64 is operable for driving the rolling platform 12 through the drive-by-wire connector port 42. The operator interface 64 may be fixed with respect to the seat 46 or movable in relation thereto. In the preferred embodiment of FIG. 1, the operator interface 64 is represented as being articulated for being pivotable with respect to the driver's seat 46. In FIG. 1, the operator interface 64 is depicted as being connected to the drive-by-wire connector port 42 via a connector 74 for transmitting electrical signals from the operator interface 64 to the drive-by-wire connector port 42 when the connector 74 is interfitted therewith. The embodiment depicted in FIG. 1 includes the passageway 70 through the seat pedestal 60 and mounting arms 66 and 68 for the operator interface 64 through the hollow of all of which the connector 74 extends. The invention contemplates other configurations in which the connector 74 connects the operator interface 64 to the drive-by-wire connector port 42 by means other than a passageway. Furthermore, the invention contemplates configurations in which the connector 74 is a wire bundle linking the sensor 62 to the pinion/gear drive arrangement 56 for the circular platform and to the sensors 63 to the pinion/gear drive arrangement 58 for the driver's seat.

Those skilled in the art will recognize various designs for an operator interface 64 capable of transforming rotary position input from a driver's seat into an electrical signal to be transmitted to the drive-by-wire connector port 42 of the chassis or rolling platform 12 if the operator interface 64 is operably connected to the drive-by-wire connector port 42 by the connector 74. The operator interface 64 could include one or more manual joysticks, and may further include a touch screen or keyboard design.

The drive-by-wire connector port 42 of the preferred embodiment may perform multiple functions, or select combinations thereof. First, the drive-by-wire connector port 42 may function as an electrical power connector, i.e., it may be configured to transfer electrical energy generated by components on the vehicle 8 to the operator interface 64 or other non-frame destination. Second, the drive-by-wire connector port 42 may function as a control signal receiver, i.e., a device configured to transfer non-mechanical control signals from a non-vehicle source, such as the operator interface 64, to controlled systems including the steering system 30, the braking system 32, and the energy conversion system 34. Third, the drive-by-wire connector port 42 may function as a feedback signal conduit through which feedback signals are made available to a vehicle driver. Fourth, the drive-by-wire connector port 42 may function as an external programming interface through which software containing algorithms and data may be transmitted for use by controlled systems. Fifth, the drive-by-wire connector port 42 may function as an information conduit through which sensor information and other information is made available to a vehicle driver. The drive-by-wire connector port 42 may thus function as a communications and power "umbilical" port through which all communications between the chassis or rolling platform 12 and the attached operator interface 64 and other attachments to the frame are transmitted. The drive-by-wire connector port 42 is essentially an electrical connector. Electrical connectors include devices configured to operably connect one or more electrical wires with other electrical wires. However, it is within the purview of this invention to have a foot pedal 65 in front of the left front driver's position of the carousel to provide for vehicle control by foot action such as braking.

The steering system 30 is housed in the chassis or rolling platform 12 and is operably connected to the front wheels 18, 20. Preferably, the steering system 30 is responsive to non-mechanical control signals. In the preferred embodiment, the steering system 30 is by-wire. A by-wire system is characterized by control signal transmission in electrical form. In the context of the present invention, "by-wire" systems, or systems that are controllable "by-wire," include systems configured to receive control signals in electronic form via a control signal receiver, and respond in conformity to the electronic control signals.

Examples of steer-by-wire systems are described in U.S. Pat. No. 6,176,341, issued Jan. 23, 2001 and assigned to Delphi Technologies, Inc.; U.S. Pat. No. 6,208,293, issued Mar. 27, 2001 and assigned to Robert Bosch GmbH; U.S. Pat. No. 6,219,604, issued Apr. 17, 2001 and assigned to Robert Bosch GmbH; U.S. Pat. No. 6,318,494, issued Nov. 20, 2001 and assigned to Delphi Technologies, Inc.; U.S. Pat. No. 6,370,460, issued Apr. 9, 2002 and assigned to Delphi Technologies, Inc.; and U.S. Pat. No. 6,394,218, issued May 28, 2002 and assigned to T R W Fahrwerksysteme GmbH & Co. KG; which are hereby incorporated by reference in their entireties.

Referring again to FIG. 1, a braking system 32 is mounted to the frame 16 and is operably connected to the wheels 18, 20, 22, 24. The braking system is configured to be responsive to non-mechanical control signals. In the preferred embodiment, the braking system is by-wire, and is connected to the drive-by-wire connector port 42 and is configured to receive electrical braking control signals via the drive-by-wire connector port 42.

Examples of brake-by-wire systems are described in U.S. Pat. No. 5,366,281, issued Nov. 22, 1994 assigned to General Motors Corporation; U.S. Pat. No. 5,823,636, issued Oct. 20, 1998 assigned to General Motors Corporation; U.S. Pat. No. 6,305,758, issued Oct. 23, 2001 assigned to Delphi Technologies, Inc.; and U.S. Pat. No. 6,390,565, issued May 21, 2002 assigned to Delphi Technologies, Inc.; which are hereby incorporated by reference in their entireties.

Figure 6:
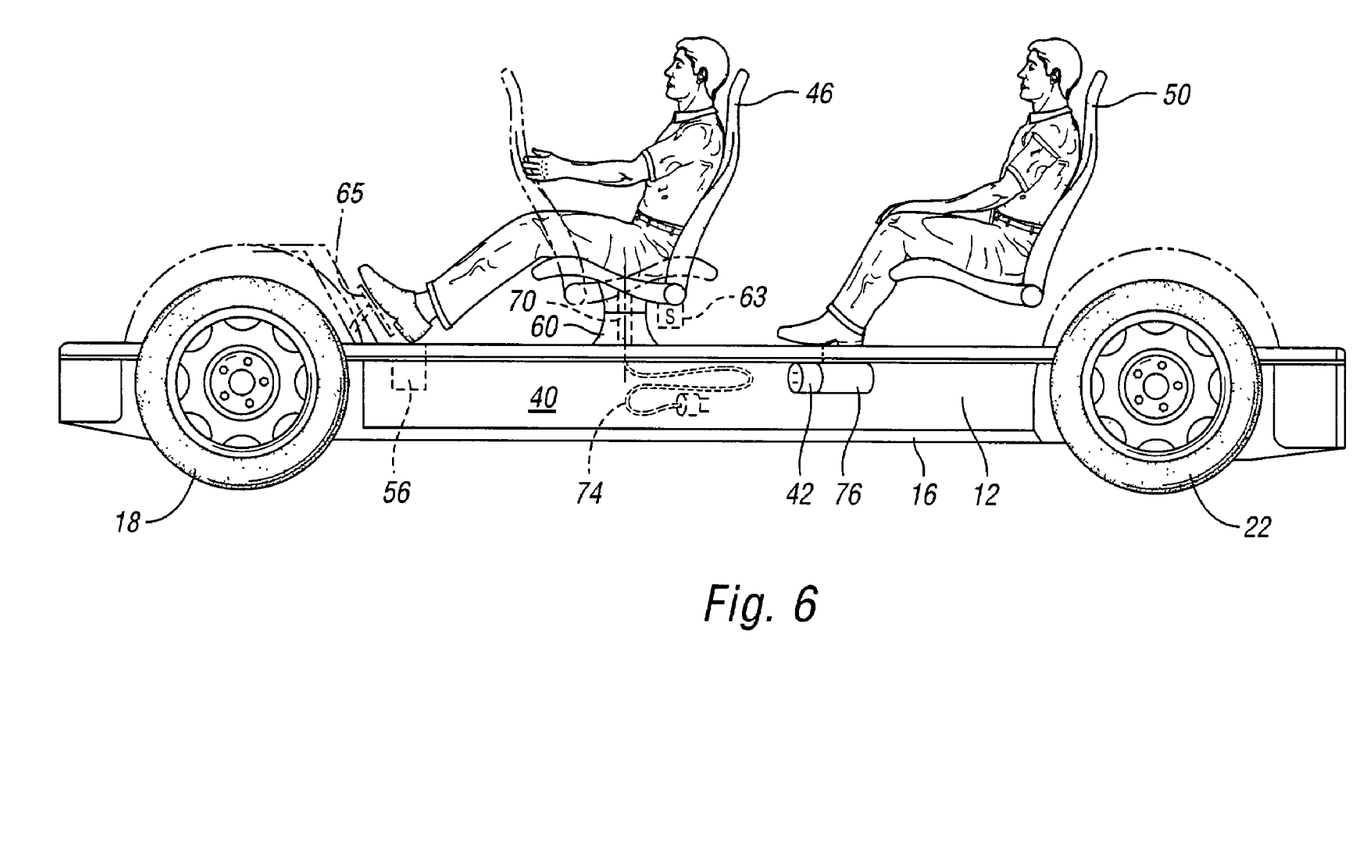
FIG. 6 is a schematic side illustration of the vehicle cockpit on a vehicle chassis or rolling platform with body and interface removed to show the electrical by-wire connector between the driver's seat (rotated in phantom) and the chassis or rolling platform of the vehicle of FIG. 1.

The energy conversion system 34 includes an energy converter that converts the energy stored in an energy storage system to mechanical energy that propels the vehicle 8 by applying the mechanical energy to rotate the front wheels 18, 20 or rear wheels 22, 24. Those skilled in the art will recognize many types of energy converters that may be employed within the scope of the present invention. The energy conversion system is configured to respond to non-mechanical control signals. The energy conversion system of the preferred embodiment is controllable by-wire, as depicted in FIG. 6.

Referring again to FIG. 1, the sensor 63 is connected to the seat 46. The sensor 63 is designed to sense a rotational change in position of the seat 46 and transmit information concerning the change in the form of an electrical current through the connector 74 to a control unit 76 located in the chassis or rolling platform 12. The control unit 76 is operably connected to the steering system 30, the braking system 32 and the energy conversion system 34. The entire assembly of drive-by-wire connector port 42, control unit 76, steering system 30, the braking system 32 and energy conversion system 34 is also referred to in the invention as a drive-by-wire control. The control unit 76 is programmed to adjust the nonmechanical control signals sent to the pinion/gear arrangements 56, 58 based upon a rotational or revolvable change in seat position communicated via the sensors 62, 63 and the connector 74. The control unit 76 may be programmed to coordinate the rotation of seat 46 with the rotation of the circular platform 52 in response to signal received from sensors 62 and 63 so that the driver's seat will always be facing in the direction of vehicle travel and so that the rotation of both the driver's seat and the circular platform will be sufficiently limited so that the connector 74 will not be overly twisted. Those skilled in the art will recognize a variety of ways to program the control unit to respond-to such input factors.

The invention may also be a control cockpit adapted as a supplier subassembly for installation in and use on a vehicle that is controllable through a drive-by-wire connector port. An embodiment of the control cockpit 80 is depicted in FIG. 1. In this embodiment the control cockpit 80 includes the carousel circular platform 62 that is adapted to mount rotatably on the vehicle. The platform 62 has structure forming a first passageway 70. The first passageway 70 is depicted in the form of a circular hole. The invention contemplates that the first passageway 70 may take a variety of other shapes and forms. The control cockpit 80 also has a driver's seat 46 and a passenger seat 48 that are mounted on the circular platform 52 in a manner to be rotatable and revolvable to a variety of different positions with respect to the rolling platform when the control cockpit 80 is mounted on the vehicle. The rolling platform 12 has structure forming a second passageway or space 40. The second passageway or space 40 is depicted in FIG. 6 as being in the form of a packaging space beneath the seat 46. The invention contemplates that the second passageway or space 40 may take a variety of other shapes and forms. The seat 46 is mounted on the circular platform 52 in such a manner that the second passageway or space 40 is in communication with the first passageway 70. The control cockpit 80 includes the driver interface 64 that is movable with the seat 46. The driver interface 64 is usable for operating the vehicle when the control cockpit 80 is mounted on the vehicle. In the embodiment depicted in FIG. 1, the driver interface 64 is mounted in a fixed position with respect to the seat 46 and is rotatable with the seat 46. The invention also contemplates configurations in which the driver interface 64 is not mounted in a fixed position with respect to the seat 46 but is movable therewith. The control cockpit 80 also includes a connector 74 that is configured with enough slack for connection on one end with the drive-by-wire connector port 42 on the vehicle. The connector 74 is connected at the other end to the driver interface 64 and sensors 60, 63 and motor driven pinion gear arrangements 56, 58. The connector 74 extends through the first passageway 70 and the second passageway or space 40 such that it does not interfere with the rotation of the seat 46 or overly twist the wires forming the connector.

The control cockpit 80 may also include sensors 62, 63 that are operably connected with respect to the seat 46 and capable of sensing a rotational or revolvable change in position of the seat 46. Those skilled in the art will recognize sensors capable of sensing and communicating such a change. The embodiment depicted in FIG. 6 shows the sensor 63 mounted directly to the bottom of the bodily support portion of the seat 46 and sensor 62 mounted in the rolling platform 12 adjacent the circular platform 52. Other locations and mechanisms for operably connecting the sensor 63 to the seat 46 and the sensor 62 to the rolling platform 12 are also contemplated by the invention.

Figure 4:
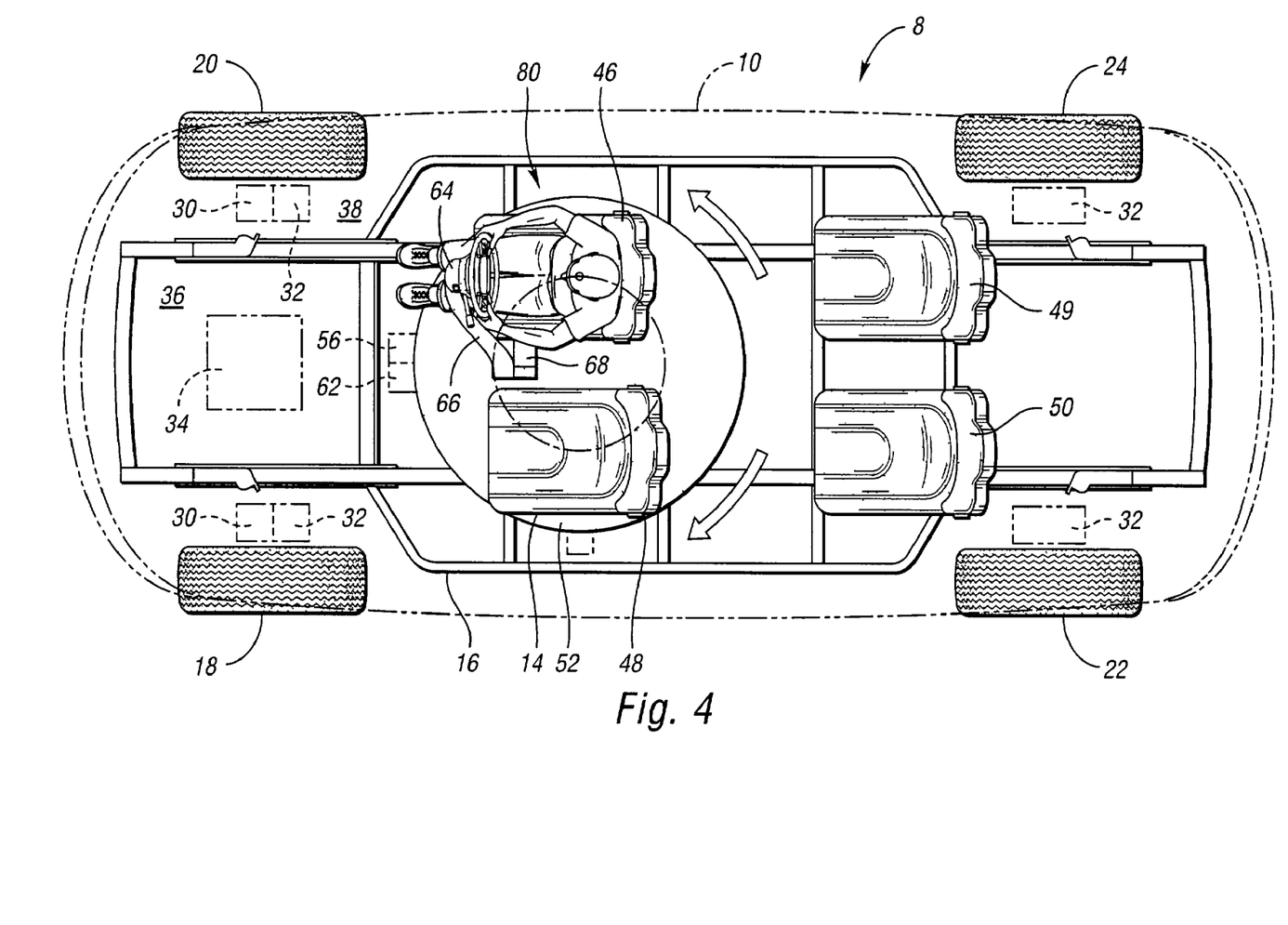
FIG. 4 is a schematic illustration of the driver's seat revolved and rotated to a right-front driving position for the vehicle of FIG. 1.

In the broadest sense and with reference to FIG. 4, the circular platform 52 may be a vehicle body floor portion fixed with respect to the chassis. This embodiment may have a transverse slot in the floor portion beneath seat 46. A motorized drive connected to the driver's seat enables the seat to move laterally a short distance such as four to six inches to adjust the driver's position to his/her preference. Such adjustment may accommodate a passenger in the passenger seat 48. Another slot at a right angle to the transverse slot may provide for a short longitudinal adjustment of the driver's seat.

OPERATION

FIGS. 1 and 2 show the driver's seat 46 in the left front driving position.

Figure 3:
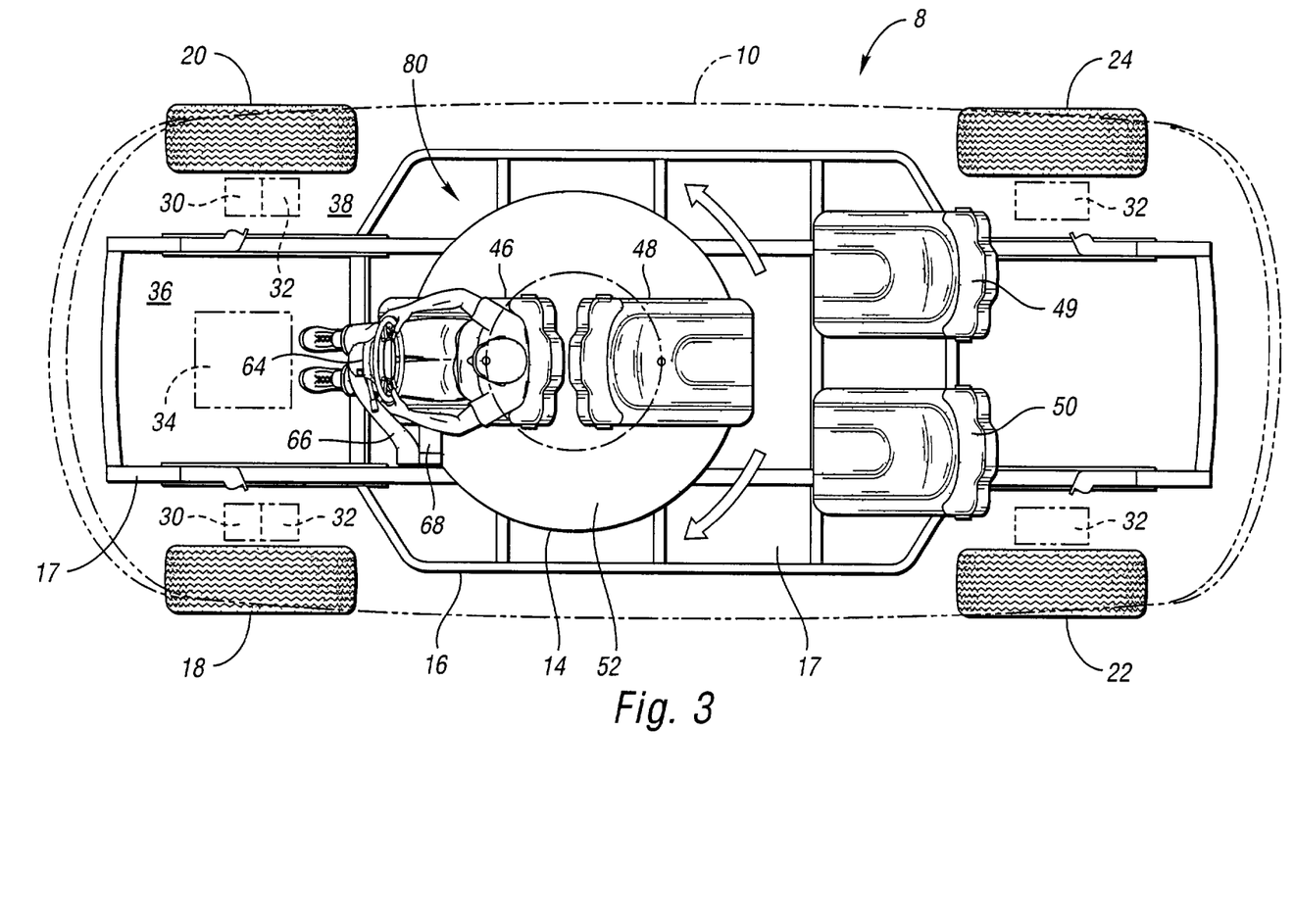
FIG. 3 is a schematic illustration of the driver's seat revolved and rotated to a center-front driving position for the vehicle of FIG. 1.

FIG. 3 shows the driver's seat revolved clockwise to a front center driving position. This results when such position is selected on the interface 64 to rotate the circular platform 52 90° from the left front position.

FIG. 4 shows the driver's seat revolved clockwise to a front right driving position. This results when such position is selected on the interface 64 to rotate the circular platform 52 180° from the left front position.

Figure 5:
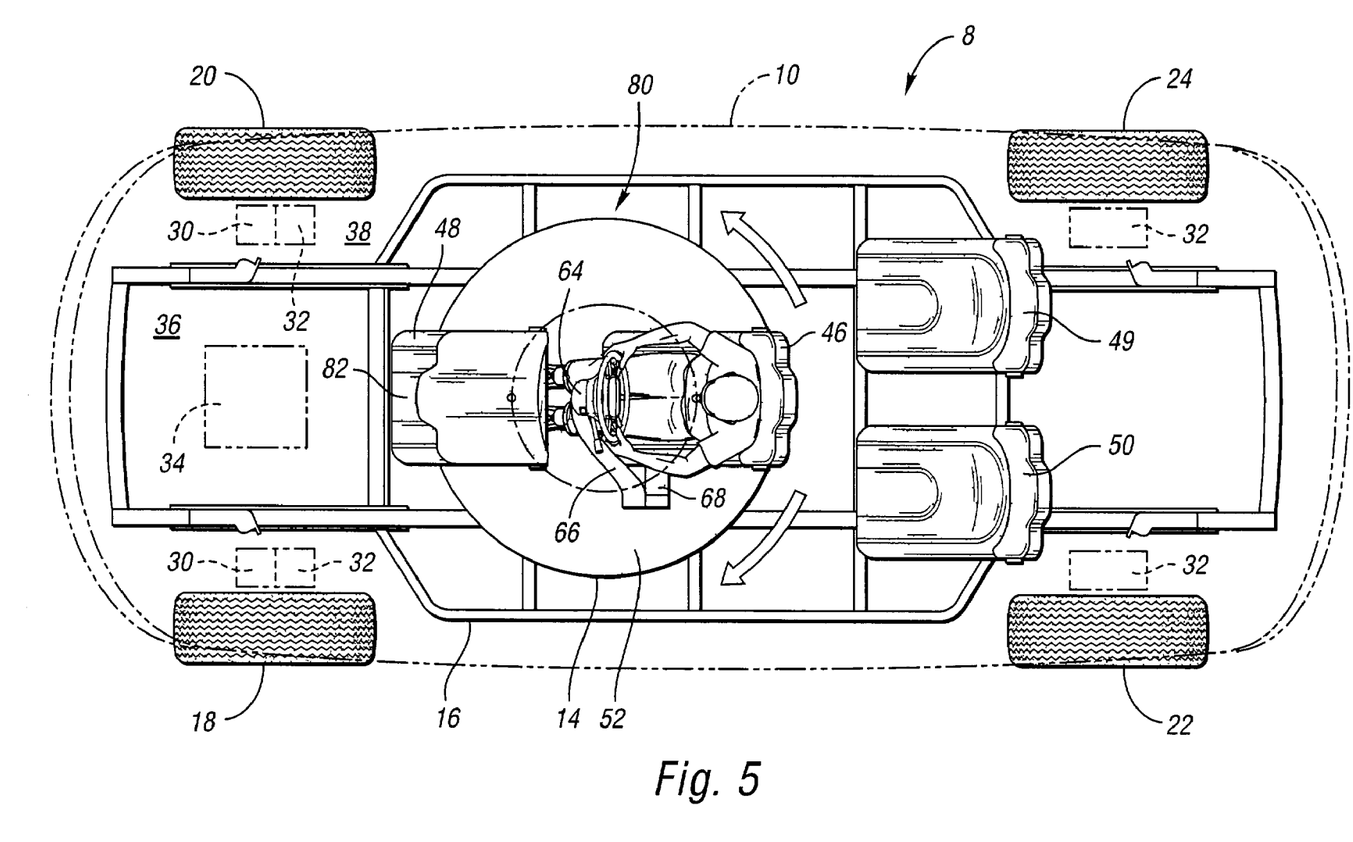
FIG. 5 is a schematic illustration of the driver's seat revolved and rotated to a rear-center driving position for the vehicle of FIG. 1 with the seatback of the other front seat folded down.

FIG. 5 shows the driver's seat revolved counter-clockwise (to avoid over-twisting connector 74) to a rear center driving position. This results when such position is selected on the interface 64 to rotate the circular platform counter-clockwise 90° from the left front position. In this position, the seatback 82 of the passenger seat 48 is folded down to form a flat surface in front of the driver for supporting driving aids such as maps and cups.

In the broader aspect of this invention and in another embodiment, the circular platform 52 is a fixed portion of the vehicle's floorboard. This floorboard portion has a lateral slot or other equivalent means beneath the driver's seat to accommodate lateral movement of the seat with respect to the vehicle's fixed portion. Such an arrangement may also be provided beneath the passenger's seat.

While the best modes for carrying out the invention have been described in detail, those familiar with the art to which this invention relates will recognize various alternative designs and embodiments for practicing the scope of the invention within the scope of the appended claims.

What is claimed is:

1. A driver control for a vehicle comprising:
 a chassis;
 carousel structure rotatable with respect to the chassis; and
 seating structure revolvable with the carousel structure to a plurality of positions from which a driver can control the vehicle;
 wherein the seating structure is rotatable with respect to the carousel structure.

2. The driver control of claim 1, wherein the revolution of the seating structure is coordinated with the rotation of the carousel structure so that the seating structure revolves and faces in one predetermined direction as the carousel structure rotates.

3. A driver control cockpit adapted for a drivable vehicle having a rolling platform configured to provide steering, braking, and accelerating functions to the vehicle and controllable from the cockpit, the control cockpit comprising:
 carousel structure adapted to be rotatable with respect to the rolling platform;
 seating structure revolvable with the carousel structure to a plurality of positions from each of which a driver can drive the vehicle; and
 a driver vehicle interface positionable with respect to the seating structure for operation in each of the positions, connectable to the rolling platform, and configured to control at least one of the steering accelerating, and braking functions of the rolling platform;
 wherein the seating structure is rotatable with respect to the carousel structure.

4. The driver control cockpit of claim 3, wherein the rolling platform is controllable for at least another of the steering, braking, and accelerating functions by a foot action.

5. The driver control cockpit of claim 3, wherein the revolution of the seating structure is coordinated with the rotation of the carousel structure so that the seating structure faces in one predetermined direction as the carousel structure rotates.

6. The driver control cockpit of claim 3, wherein the rolling platform is controlled for the at least one of the vehicle driving functions in accordance with the position of the seating structure.

7. A driver control cockpit adapted for a drivable vehicle having a rolling platform controllable from the cockpit, the control cockpit comprising:
 carousel structure including a pedestal defining a passageway adapted to be rotatable with respect to the rolling platform;
 seating structure operatively connected to the pedestal and revolvable with the carousel structure to a plurality of positions from each of which a driver can drive the vehicle; and
 a driver vehicle interface positionable with respect to the seating structure for operation in each of the positions and connectable to the rolling platform to control the rolling platform through the passageway in the pedestal;
 wherein the seating structure includes a driver seat and a passenger seat adjacent to each other and revolvable with the passageway, and wherein a connection of the driver vehicle interface to the rolling platform includes a wire bundle having sufficient slack in cooperation with the revolving passageway so that control data may be passed between the driver vehicle interface and the rolling platform without overly twisting the wire bundle.

8. A driver control cockpit adapted for a drivable vehicle having a rolling platform controllable from the cockpit, the control cockpit comprising:
 carousel structure including a pedestal defining a passageway adapted to be rotatable with respect to the rolling platform;
 seating structure operatively connected to the pedestal and revolvable with the carousel structure to a plurality of positions from each of which a driver can drive the vehicle; and
 a driver vehicle interface positionable with respect to the seating structure for operation in each of the positions and connectable to the rolling platform to control the rolling platform through the passageway in the pedestal;

wherein the plurality of positions is up to four positions forming a diamond pattern for the seating structure sufficient to define selectively a left-hand drive, right-hand drive, center-front drive, and center-rear drive.

9. A vehicle comprising:

a controllable rolling platform;

carousel structure rotatable with respect to the rolling platform;

seating structure revolvable with respect to the rolling platform to a plurality of positions from each of which a driver can drive the vehicle; and a driver vehicle interface positionable with respect to the seating structure for operation in each of the positions and connectable to the rolling platform to control the platform;

wherein the seating structure includes a driver's seat and a passenger seat.

10. The vehicle of claim 9, wherein the passenger seat has a foldable seatback, and one of the plurality of positions of the seating structure positions the driver's seat behind the passenger seat with the foldable seatback folded down to provide a support table in front of the driver's seat.

11. A vehicle comprising:

a controllable chassis including a by-wire steering system;

seating structure movable with respect to the chassis to a plurality of positions from each of which a driver can drive the vehicle; and a driver vehicle interface movable with the seating structure for operation in each of the positions and connectable to the chassis to control the by-wire steering system.

\* \* \* \* \*